(12) United States Patent
Yamada et al.

(10) Patent No.: US 8,066,189 B2
(45) Date of Patent: Nov. 29, 2011

(54) CODE SYMBOL READING APPARATUS (75) Inventors: Yoshiya Yamada, Shizuoka (JP);
Hitoshi Iizaka, Shizuoka (JP); Osamu Tsuchiya, Shizuoka (JP); Hidehiro Naitou, Shizuoka (JP); Norihiko Kurihara, Shizuoka (JP); Hidemi Mihara, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 540 days.

(21) Appl. No.: 12/204,089

(22) Filed: Sep. 4, 2008

(65) Prior Publication Data
US 2009/0072039 A1    Mar. 19, 2009

(30) Foreign Application Priority Data
Sep. 19, 2007 (JP) ................. 2007-243127

(51) Int. Cl.
*G06K 7/10* (2006.01)
(52) U.S. Cl. .......... 235/462.35; 235/462.14; 235/462.43
(58) Field of Classification Search ............. 235/462.35, 235/462.43, 462.01, 462.14
See application file for complete search history.

(56) References Cited

U.S. PATENT DOCUMENTS

| 4,988,851 A * | 1/1991 | Kohno et al. | 186/61 |
| 5,177,345 A * | 1/1993 | Baitz | 186/61 |
| 5,183,135 A * | 2/1993 | Kurimoto et al. | 186/61 |
| 5,798,516 A * | 8/1998 | Shreesha | 235/462.42 |
| 5,814,799 A * | 9/1998 | Swartz et al. | 235/383 |
| 6,990,463 B2 * | 1/2006 | Walter et al. | 705/16 |
| 7,000,833 B2 * | 2/2006 | Sato | 235/383 |

FOREIGN PATENT DOCUMENTS

| JP | 2003-296658 A | 10/2003 |
| JP | 2005-025311 A | 1/2005 |

OTHER PUBLICATIONS

Japanese Office Action dated Aug. 18, 2009 (2 pages), and partial English translation thereof (2 pages), issued in counterpart Japanese Application Serial No. 2007-243127.

* cited by examiner

*Primary Examiner* — Ahshik Kim
(74) *Attorney, Agent, or Firm* — Patterson & Sheridan, LLP (57) ABSTRACT

A case has a front surface facing an image sensing area, a concave formed on the front surface, and an opening on the bottom of the concave. The case accommodates an area image sensor to image-sense the image sensing area through the opening, and an illumination device to illuminate the entire image sensing area. There are provided a photoelectric converting unit converting an output of the area image sensor into an electric image signal, and an output unit outputs an image signal converted by the photoelectric converting unit to an image processing device. The case also accommodates a lens to form an image of the image sensing area on the area image sensor with a depth of field so as to the image processing device obtain a resolution to enable analysis of a code symbol included in the image signal. A lens side limit position of the depth of field corresponds with the position of the front surface of the case.

3 Claims, 6 Drawing Sheets

CODE SYMBOL READING APPARATUS

CROSS REFERENCE TO RELATED APPLICATION

The present application is based on and claims the benefit of priority of Japanese Patent Application No. 2007-243127 filed on Sep. 19, 2007, the entire contents of which is incorporated herein by reference.

BACKGROUND OF THE INVENTION

1. Field of the Invention

The present invention relates to a code symbol reading apparatus, and more particularly, to a code symbol reading apparatus for infallibly and easily reading a code symbol of a commercial product in a wide range including peripheral positions of the apparatus.

2. Discussion of Related Art

As a code symbol reading apparatus which optically reads an image of a code symbol such as a barcode attached to a product and obtains a product code from the read image, an apparatus using an area image sensor such as a CCD image sensor is known. This code symbol reading apparatus extracts image information of a barcode as a subject from image data obtained with the CCD image sensor, analyzes the obtained image information and obtains code information of the barcode, i.e., a product code.

Figure 4A:
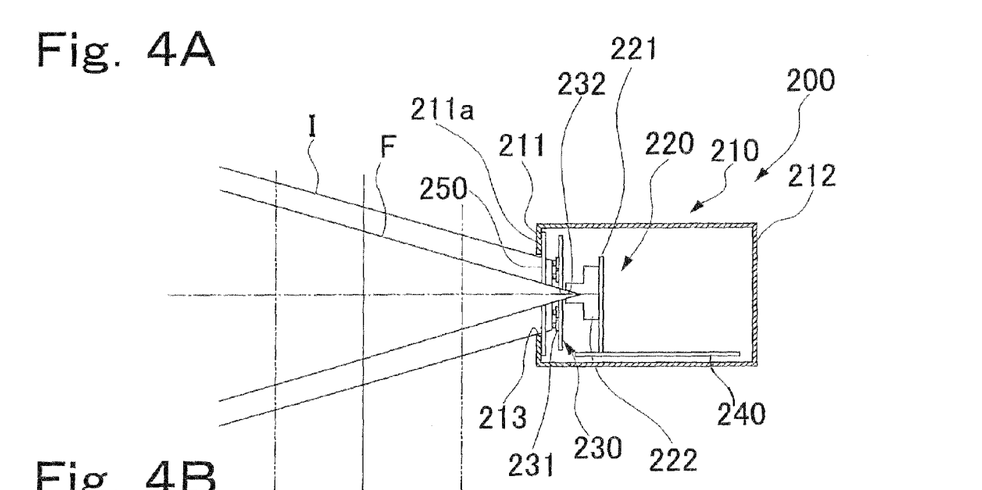
FIG. 4A is a cross-sectional view schematically showing the structure of the conventional code symbol reading apparatus.

FIG. 4A is a cross-sectional view schematically showing the structure of a conventional code symbol reading apparatus. The code symbol reading apparatus 200 has an approximately rectangular parallelepiped case 210 formed with a front cover member 211 which is provided on the image sensing area F side where a product is placed and which has an image sensing opening 213, and a back cover member 212 which is engaged with the front cover member 211 and which is provided on the side opposite to the image sensing area side.

An image sensing device 220 to take image of the image sensing area F, an illumination board 230 to illuminate the image sensing area F and an image processing board 240 are provided in the case 210. The image sensing device 220 image-senses a barcode attached to a product, and the image processing board 240 analyzes image data of the image-sensed barcode and outputs product data.

The image sensing device 220 has an image sensing board 221 including a CCD image sensor (not shown) as an area image sensor and a driving circuit (not shown) for the CCD image sensor, and an lens 222 to form an image of the image sensing area F on the CCD image sensor. The illumination board 239 is provided with an image sensing opening 232 of the lens 222 in its central portion. Plural LEDs (Light Emitting Diodes) 231 to emit illumination light to the image sensing area F are provided around the opening 232. The image processing board 240 extracts a barcode portion from image data of a product outputted from the image sensing board 221, analyses the barcode data and obtains a product code.

In this code symbol reading apparatus 200, a front surface 211a is provided in a position closest to the image sensing area F side in the front cover member 211 of the case. A plate type transparent cover 250 is provided so as to cover the opening 213 on the rear side of the front surface 211a. The image sensing opening 232 of the lens 222 is provided on the illumination board 230, and the LEDs 231 are provided so as to be positioned inside the opening 213 on the image sensing area F side. Light from the LEDs 231 is emitted on an illumination area I including the image sensing area F.

A barcode of a product placed in the image sensing area F is image-sensed with the image sensing device 220. Then the image processing board 240 extracts image data of the barcode from image data of the product obtained with the image sensing device 220, then analyses the image data and obtains a product code.

As a code symbol reading apparatus having such area image sensor, Japanese Published Unexamined Patent Application No. 2005-025311 discloses a barcode reader having plural LEDs to emit illumination light on a barcode symbol and a CCD on which reflected light from the barcode symbol is image-formed via a light receiving lens. In the barcode reader, the respective LED emitting portions are covered with LED caps for light diffusion. The respective LED caps have a diffusion characteristic to diffuse the light emitted from the respective LEDs so as to form a uniform illumination distribution surface on the barcode symbol.

Figure 4B:
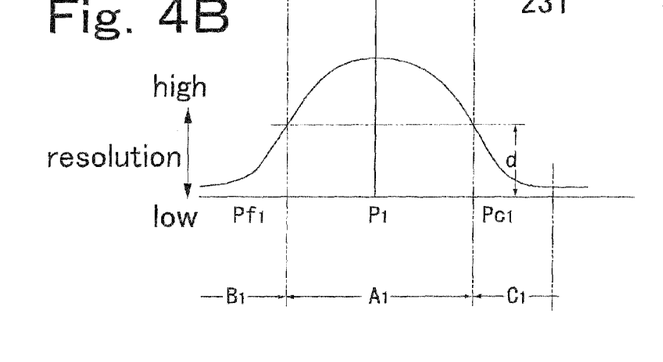
FIG. 4B is a graph showing the resolution of image data.

In many cases, in the conventional code symbol reading apparatus, for the purpose of cost reduction, the lens 222 is a fixed focus lens. In this case, in accordance with barcode position in the image sensing area F, an image obtained by image sensing may become a so-called "out-of-focus" image. From a viewpoint of resolution, as shown in FIG. 4B, in such blurred image, the resolution is a maximum in a focus position P1 of the lens, and becomes lower in the vicinity of the focus position.

Upon analysis of code symbol image by the image processing board 240, when image data as the subject of processing is in a resolution equal to or lower than a predetermined value d, analysis cannot be performed and a product code cannot be outputted. Accordingly, the barcode reading range is a predetermined area (depth of field A1) between a lens side limit Pc1 and a limit Pf1 opposite to the lens side positioned with the focus position P1 therebetween. Generally, as the depth of field A1, the focal distance of the lens 222 or the like is selected such that a product can be easily placed. That is, the depth of field A1 is selected for the optimum placement of product in the focus position P1.

In an area out of the depth of field A1, an outer area B1 of the limit Pf1 opposite to the lens side and an inner area C1 from the inside of the lens side limit Pc1 to the surface of the front cover member 211, as the resolution of image data is low, the barcode of a product placed in these areas cannot be read. On the lens side limit Pc1 side, the lens side limit Pc1 of the depth of filed A1 is away from the case 210. When a product is placed in a position closer to the case 210 than the lens side limit Pc1, the barcode of the product cannot be analyzed.

When a barcode attached to the product cannot be read with such code symbol reading apparatus, an operator places the product in the image sensing area of the code symbol reading apparatus again to perform barcode reading. However, in the conventional code symbol reading apparatus, the depth of field A1 of the image sensing device in the image sensing area is not clear. Accordingly, in some cases the operator cannot place the product in the depth of field A1 of the image sensing device again, and reading cannot be performed.

As long as the apparatus can infallibly perform barcode reading when the product is placed in a position close to the case of the code symbol reading apparatus in such retry, barcode reading can be performed only by allowing the operator to place the product in a position in close vicinity to the code symbol reading apparatus. Accordingly, a code symbol reading apparatus which infallibly performs barcode reading when a product is placed in a position close to the case of the apparatus is needed.

BRIEF SUMMARY OF THE INVENTION

The present invention has been made in consideration of the above situation, and provides a code symbol reading apparatus for infallibly and easily reading a code symbol of a product within a wide range including peripheral positions of the apparatus.

According to embodiment of the present invention, a code symbol reading apparatus includes a case having a front surface facing an image sensing area, a concave formed on the front surface, and an opening on the bottom of the concave, an area image sensor provided inside the case to image-sense the image sensing area through the opening, an illumination device provided inside the case without interference to the scope of image sensing by the area image sensor to illuminate the entire image sensing area, a photoelectric converting unit converting an output of the area image sensor into an electric image signal, an image processing device extracting an image signal of a code symbol from the image signal converted by the photoelectric converting unit, and analyzing the extracted image signal, and outputting a product code, and a lens provided inside the case to form an image of the image sensing area on the area image sensor with a depth of field so as to the image processing device obtain a resolution to enable analysis of a code symbol included in the image signal. A lens side limit position of depth of field corresponds with the position of the front surface of the case.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

First, a code symbol reading apparatus as a premise of the present invention will be described based on FIGS. 5A and 5B and FIGS. 6A and 6B. In these figures, constituent elements corresponding to those shown in FIG. 4A have the same reference numerals and detailed explanations thereof will be omitted.

Figure 5A:
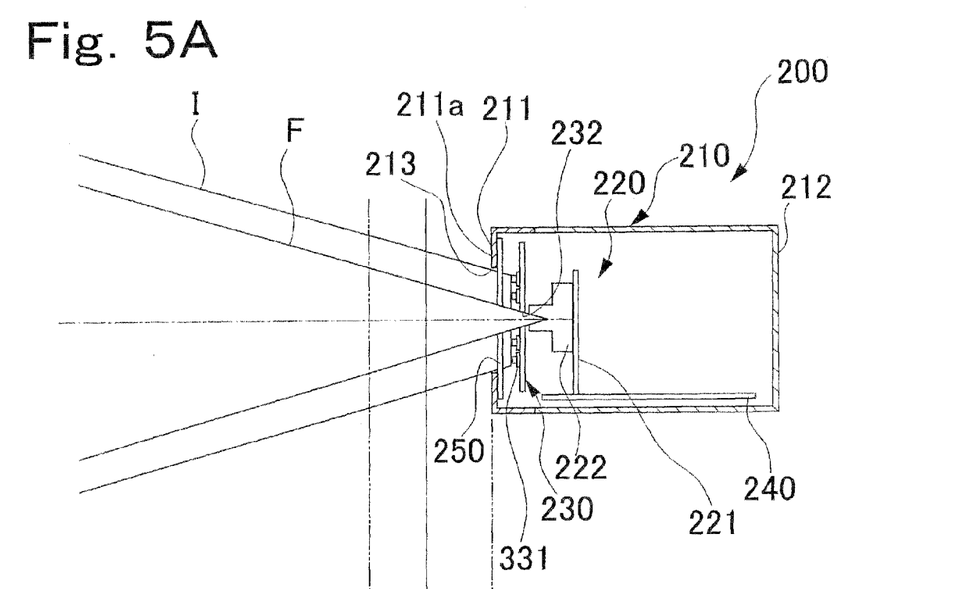
FIG. 5A is a cross-sectional view schematically showing the structure of a code symbol reading apparatus as a premise of the present invention.
Figure 5B:
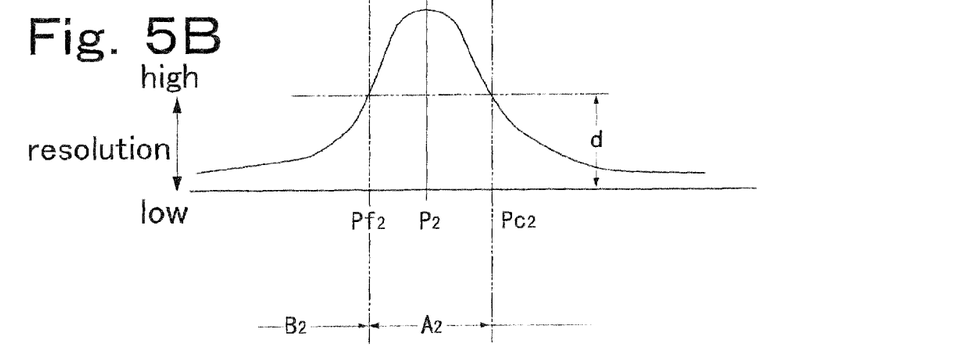
FIG. 5B is a graph showing the resolution of image data.

As in the case of the code symbol reading apparatus described in FIG. 4A, the code symbol reading apparatus 200 shown in FIG. 5A has the case 210, the image sensing device 220, the illumination board 230, the image processing board 240 and the transparent cover 250. The difference from the code symbol reading apparatus described in FIG. 4A is that the focal distance of the lens 222 is shorter than that of the lens in FIG. 4A, and a focus position P2 is closer to the front cover member 211 of the case 210. Further, in this code symbol reading apparatus 200, a lens side limit Pc2 of a depth of field A2 corresponds with the position of the front surface 211a of the front cover member 211. Accordingly, barcode reading can be performed even when a product is placed in a position close to the case 210. However, as the focal distance of the lens 222 is short, the depth of field A2 is narrow due to the characteristic of the lens as shown in FIG. 5B, and the operability of the apparatus is low.

Figure 6A:
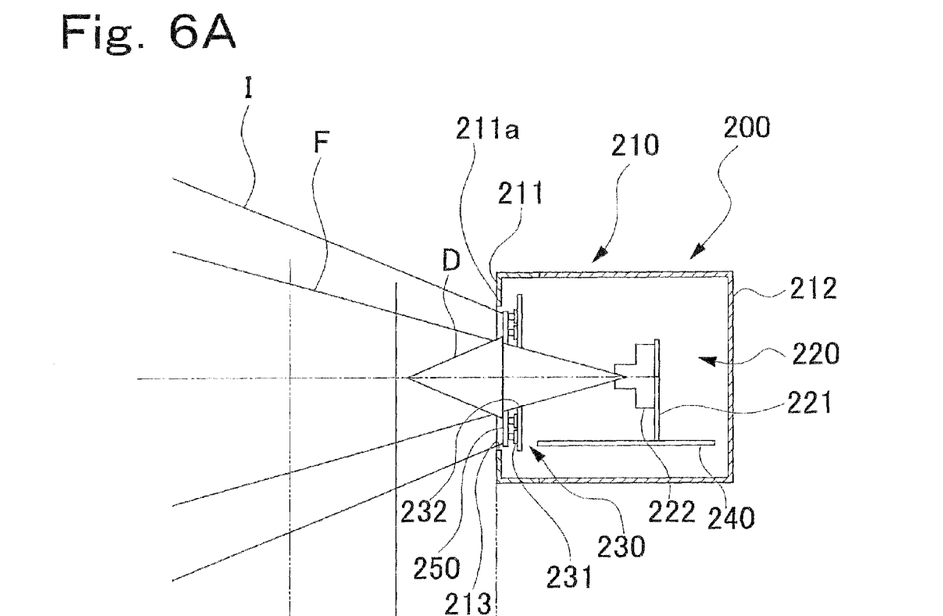
FIG. 6A is a cross-sectional view schematically showing the structure of another code symbol reading apparatus as a premise of the present invention.
Figure 6B:
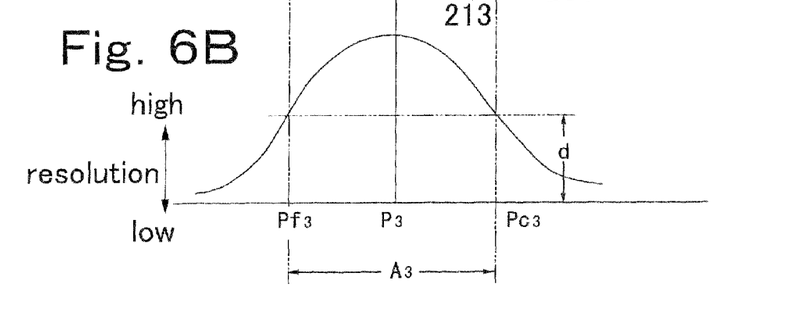
FIG. 6B is a graph showing the resolution of image data.

FIG. 6A is a cross-sectional view schematically showing the structure of another code symbol reading apparatus as a premise of the present invention. The code symbol reading apparatus 200 shown in FIG. 6A has the case 210 formed with the front cover member 211 having the opening 213 and the back cover member 212, the image sensing device 220, the illumination board 230, the image processing board 240 and the transparent cover 250. The image sensing device 220 has the same specifications as those of the image sensing device in FIG. 4A, and the position of the illumination board 230 is the same as that of the illumination board in FIG. 4A. The difference from the code symbol reading apparatus in FIG. 4A is that the position of the image sensing board 221 is changed, and a lens side limit Pc3 of a depth of field A3 corresponds with the position of the front surface 211a of the front cover member 211. That is, in the code symbol reading apparatus 200 in FIG. 6A, the image sensing device 220 is positioned away from the front cover member 211 so as to ensure the wide depth of field A3. However, in this code symbol reading apparatus 200, it is necessary to provide a large opening 232 at the center of the illumination board 230 and provide the LEDs 231 around the opening 232. Accordingly, an area D where light is not emitted on the central portion of the illumination area I occurs around the front cover member 211. When a product is placed in the area D, as it is not irradiated with illumination light, its barcode cannot be image-sensed.

In view of the problems shown in FIGS. 5A and 5B and FIGS. 6A and 6B, a best mode of the code symbol reading apparatus according to the present invention will be described based on FIG. 1, FIGS. 2A and 2B and FIGS. 3A and 3B. In the present embodiment, an upright type barcode scanner is employed as an example.

Figure 1:
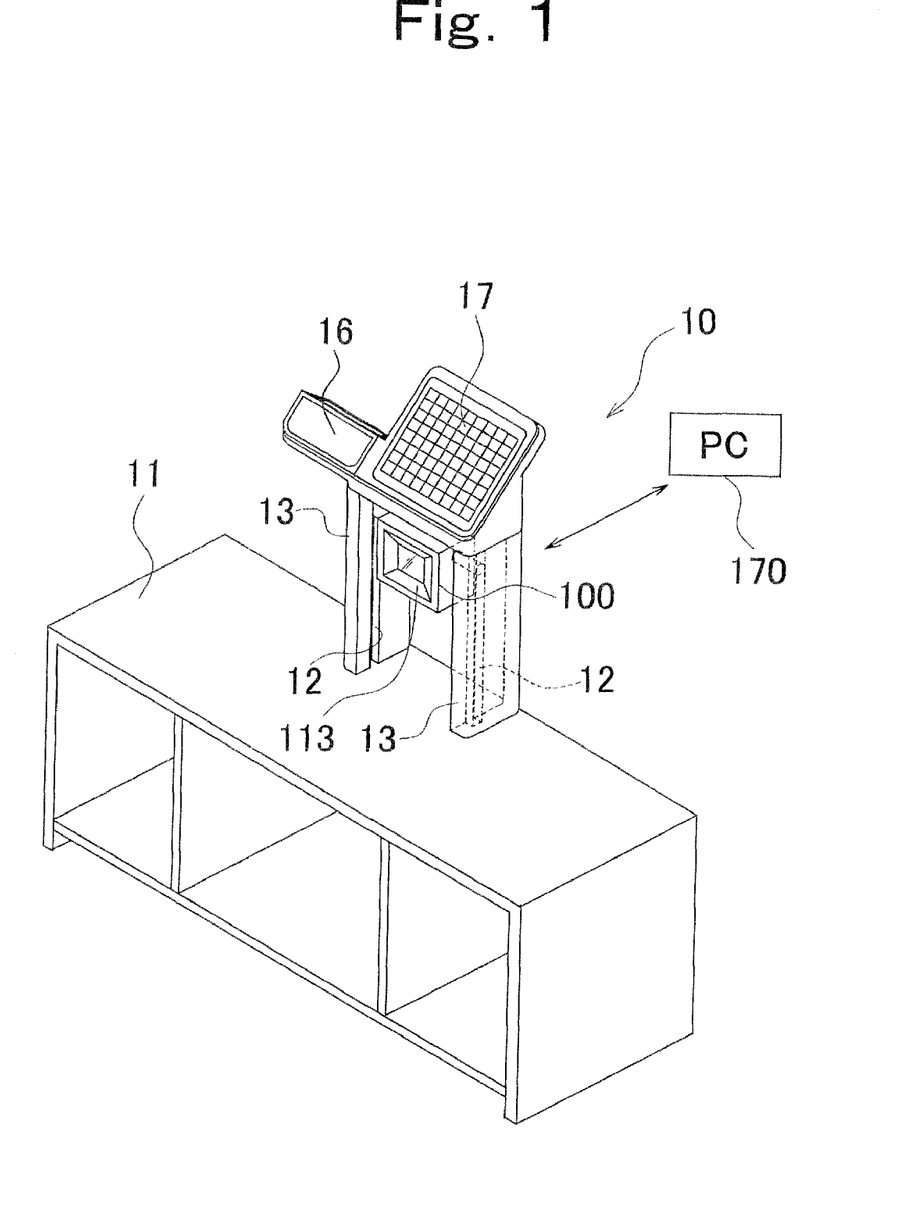
FIG. 1 is an outer appearance perspective view showing an example of a barcode scanner according to an embodiment of the present invention.

FIG. 1 is an outer appearance perspective view showing an example of a barcode scanner according to the embodiment of the present invention. A barcode scanner 10 is upright-installed on an upper surface of a checkout stand 11 (or a counter table) on which a shopping basket or the like containing products is placed. The barcode scanner 10 has a pair of posts 13 having a guide groove 12, a code symbol image sensing apparatus 100 upward/downward movably guided along the guide grooves 12, a display unit 16 and a keyboard 17 provided above the code symbol image sensing apparatus 100. The code symbol image sensing apparatus 100 optically reads a barcode as a code symbol attached to a product. The code symbol image sensing apparatus 100 is installed such that its opening 113 is directed to face the image sensing area side where a product with a barcode is placed.

Further, the barcode scanner 10 is connected to a computer 170 as an image processing device which analyzes image data of a barcode of a product obtained with the code symbol image sensing apparatus 100 and outputs a product code, via a network.

In the present embodiment, an operator places a product contained in the shopping basket in a position in front of the opening 113 of the code symbol image sensing apparatus 100 such that the apparatus optically reads a barcode as a code symbol attached to the product. Then the code symbol image sensing apparatus 100 transmits image data of the read barcode to the computer 170 as an image processing device. The computer 170 analyzes the image data of the barcode to obtain a product code, and transmits the product code to its upper apparatus. Then the upper apparatus performs product registration based on the product code.

Figure 2A:
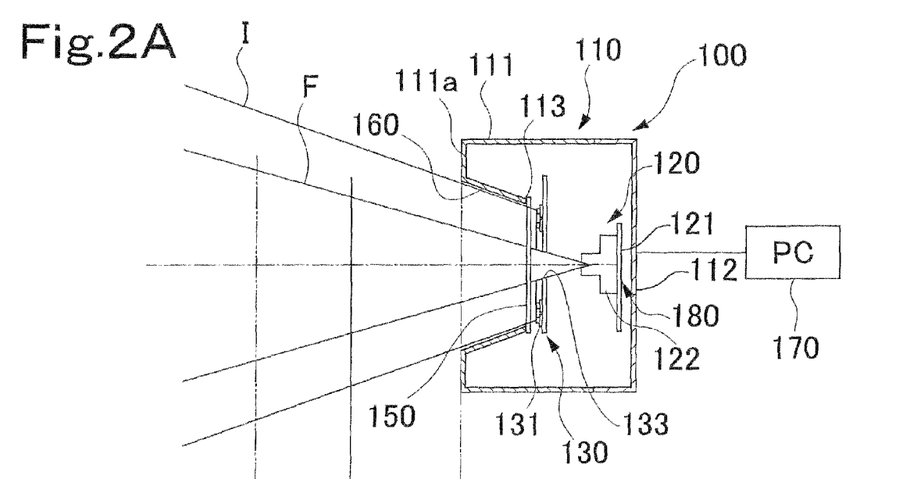
FIG. 2A is a cross-sectional view schematically showing the structure of a code symbol reading apparatus according to the embodiment of the present invention.

FIG. 2A is a cross-sectional view schematically showing the structure of the code symbol reading apparatus according to the embodiment of the present invention. The code symbol image sensing apparatus 100 has a case 110 formed with a front cover member 111 provided on the image sensing area F side where a product is placed and a back cover member 112 engaged with the front cover member 111 and provided on the side opposite to the image sensing area side.

The front cover member 111 is provided with a front surface 111a in a position closest to the image sensing area F side in the case. A concave 160 toward an area opposite to the image sensing area side from the front surface 111a is formed in the central portion of the front surface 111a. The concave 160 has a quadrangular pyramid wall in which its cross-sectional area is reduced toward its back portion, and an opening 113 is provided in the deepest position of the concave 160. Further, a plate transparent cover 150 is provided on the back cover member 112 of the opening 113 so as to cover the opening 113.

An image sensing device 120 to image-sense the image sensing area F and an illumination board 130 as an illumination device to illuminate the image sensing area F are provided in the case 110. The image sensing device 120 has an image sensing board 121 as a photoelectric converting unit, including a CCD image sensor (not shown) as an area image sensor and a driving circuit (not shown) for the CCD image sensor to convert an image to an electric signal, and an lens 122 to form an image of a barcode of a product placed in the image sensing area F. The illumination board 130 is provided on the side of the opening 113 opposite to the image sensing area, and an image sensing opening 133 is provided in the central portion of the illumination board 130. The illumination board 130 is provided with plural LEDs 131. The LEDs 131 are provided to surround the opening 133 inside the opening 113 and outside the image sensing area. Light emitted from the LEDs 131 is emitted to the illumination area I wider than the image sensing area F.

Further, the code symbol image sensing apparatus 100 has an output unit 180 to transmit an image signal of a barcode outputted from the image sensing board 121 to the computer 170 as an image processing device. The computer 170 analyzes the transmitted image signal of the barcode to obtain a product code and transmits the product code to its upper apparatus.

Figure 2B:
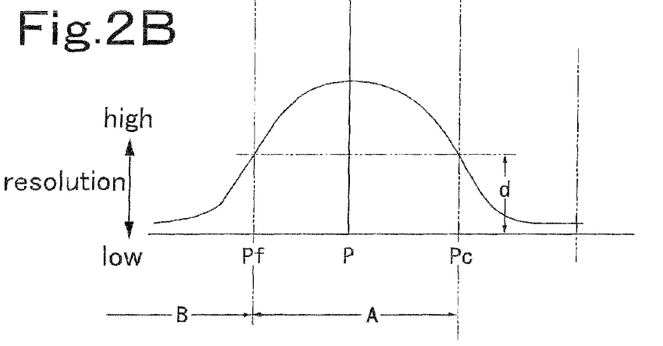
FIG. 2B is a graph showing the resolution of image data.

As described above, the reading area where barcode analysis by the image processing device is possible is an area where the resolution of an image obtained with the image sensing device 120 is equal to or higher than the predetermined value d. As shown in FIG. 2B, the reading area is an area (depth of field A) between a lens side limit Pc and a limit Pf opposite to the lens side with the focus point P therebetween. The depth of field A is determined based on the specifications of the image sensing device 120 such as a device pitch of the CCD image sensors and the focal distance of the lens 122, and the position of the image sensing device 120 in the case 110.

In the present embodiment, the depth of field A is set such that the position of the lens side limit Pc approximately corresponds with the position of the front surface 111a of the front cover member 111. Further, in the present embodiment, the depth of field A is set such that it is a sufficiently wide area including the position of the front surface 111a of the case 110 (i.e., the lens side limit Pc). Note that the sufficiently wide area corresponds to a range where the operator can place a product without being especially conscious of the depth of field A of the image sensing device. In the present embodiment, the distance from the position of the front surface 111a (i.e., the lens side limit Pc) to the limit Pf opposite to the lens side is about 150 mm, the distance from the focus position P to the limit Pf opposite to the lens side is about 100 mm, and the distance from the focus position P to the lens side limit Pc is about 50 mm.

Further, the positional relation between the lens side limit Pc and the front surface 111a is determined based on the focal distance of the lens 122 and the position of the image sensing device 120 in the case 110. In the present embodiment, the distance from the end surface of the lens 122 to the focus position P is about 110 mm. The shape and the depth of the concave 160 are selected, in consideration of the positions of the image sensing device 120 and the illumination board 130, so as not to disturb image sensing with the image sensing device 120 and illumination with the illumination board 130.

Accordingly, in the code symbol reading apparatus 100 according to the present embodiment, it is possible to place a product within a wide range including a position in close vicinity to the position of the front surface 111a and read a code symbol. Further, as the image sensing area F is included in the illumination area I of the illumination board 130, an area not irradiated with light from the illumination board 130 does not occur in the image sensing area F. Further, in the present embodiment, the case 110 has the concave 160 and the transparent cover 150 is provided on the opening 113 formed in the back of the concave 160, the probability of contact between a product and the case 110 is low. That is, upon reading of code symbol, the probability of breakage of product is low.

In the present embodiment, an image signal of a barcode outputted form the image sensing device 120 is transmitted via the network to the computer 170 as an image processing device then a product code is analyzed. Further, as described later in FIGS. 3A and 3B, the image processing device may be integrated with the image sensing device 120 and provided in the case 110.

Figure 3A:
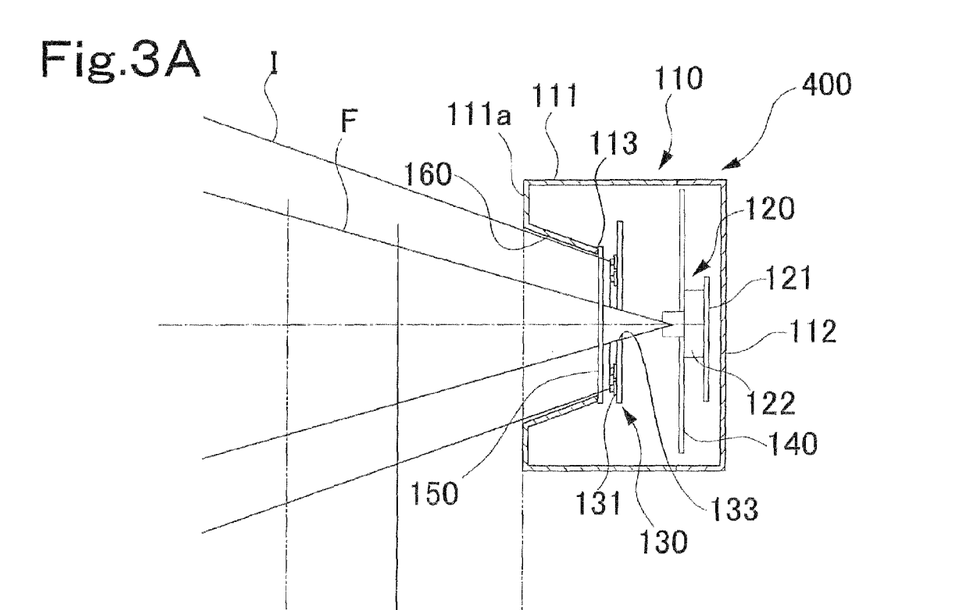
FIG. 3A is a cross-sectional view schematically showing the structure of a code symbol reading apparatus according to the embodiment of the present invention.
Figure 3B:
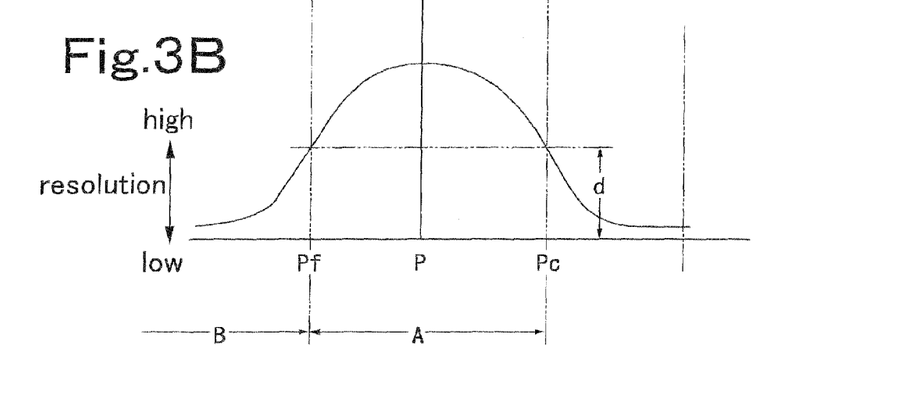
FIG. 3B is a graph showing the resolution of image data.

FIG. 3A is a cross-sectional view schematically showing the structure of the code symbol reading apparatus according to the embodiment of the present invention. In this figure, constituent elements corresponding to those shown in FIG. 2A have the same reference numerals, and detailed descriptions thereof will be omitted. As in the case of the code symbol reading apparatus shown in FIG. 2A, a code symbol reading apparatus 400 according to the present embodiment has the case 110 having the front surface 111a and the concave 160 provided with the opening 113, the image sensing device 120, the illumination board 130 and the transparent cover 150.

The image sensing device 120 and the illumination board 130 are provided in the case 110. The image sensing device 120 has the same specifications as that of the above-described image sensing device 120. The illumination board 130 is provided in the same position as that of the above-described illumination board 130. The difference from the code symbol reading apparatus shown in FIG. 2A is that an image processing board 140 as an image processing device is provided in the case 110. The image processing board 140 analyzes an image signal of a barcode from an image signal outputted from the image sensing board 121 of the image sensing device 120 and outputs a product code.

According to the code symbol reading apparatus 400 of the present invention, when the operator causes the code symbol reading apparatus 400 to read a barcode of a product, the operator stands inside the checkout stand 11 and takes out products one by one from a shopping basket placed on the upstream side of the apparatus in the lane. When a barcode is attached to a product, the operator points the barcode at the opening 113 of the code symbol reading apparatus 400 such that the barcode is read with the image sensing device 120. An image of the product read with the image sensing device 120 is sent to the computer 170 or the image processing board 140 as an image processing device. Then the image of the barcode is analyzed and a product code is outputted. Then the obtained product code is outputted to the upper apparatus, thereby product registration is performed.

When a product is placed within the depth of field A of the image sensing device, a barcode attached to the product is image-sensed with the image sensing device 120. Thereafter, when the image of the barcode is analyzed by the image processing device and outputted to the upper apparatus, a checkout sound indicating the completion of reading is emitted from the barcode scanner 10. The operator checks the sound, and puts the product in a shopping basket placed on the downstream side in the lane.

On the other hand, when the barcode cannot be read due to some reason, the operator again points the barcode attached to the product at the opening 113 of the code symbol reading apparatus 400, so as to perform reading. At this time, the operator presses the product against a position closer to the opening 113 of the front cover member 111 than the position at the previous time, i.e., in the same position as that of the front surface 111a. Then, the product can be placed in the depth of field A of the image sensing device, and the barcode can be infallibly read. That is, upon barcode reading, the concave 160 and the front surface 111a of the front cover member 111 are target positions for barcode reading.

Further, even when reading cannot be performed at once since a barcode is wrinkled or the barcode is small, the barcode can be infallibly read only by placing the product in close vicinity to the front cover member 111 of the code symbol reading apparatus 400. As a result, the operator can feel a sense of assurance, and the apparatus can be easily used.

Obviously, numerous modifications and variations of the present invention are possible in light of the above teachings. It is therefore to be understood that within the scope of appended claims, the invention may be practiced otherwise than as specifically described herein.

What is claimed is:

1. A code symbol reading apparatus, comprising:
a case having a front surface facing an image sensing area, a concave formed on the front surface and having a quadrangular pyramid wall, a cross-sectional area of which is reduced toward a bottom, and an opening on the bottom of the concave;
an area image sensor provided inside the case to capture an image in the image sensing area through the opening;
an illumination device provided inside the case so as not to interfere with capture of the image by the area image sensor to illuminate the entire image sensing area;
a photoelectric converting unit converting an output of the area image sensor into an electric image signal;
an image processing device extracting an image signal of a code symbol from the electric image signal obtained by the photoelectric converting unit, and analyzing the extracted image signal, and outputting a product code; and
a lens provided inside the case to form the image on the area image sensor with a depth of field that allows the image processing device to obtain a resolution to analyze the code symbol included in the image signal;
wherein a lens side limit position of the depth of field corresponds with the position of the front surface of the case.

2. The code symbol reading apparatus according to claim 1, wherein the opening of the case is covered by a transparent cover.

3. The code symbol reading apparatus according to claim 1, wherein the illumination device has a plurality of LEDs located inside the opening and outside the image sensing area.

* * * * *